United States Patent [19]

Juhasz

[11] Patent Number: 4,754,779

[45] Date of Patent: Jul. 5, 1988

[54] CENTRAL CIRCULATOR AND MIXER FOR FOUNTAIN SOLUTION FOR PRINTING PRESSES

[76] Inventor: Gabor Juhasz, 30 Vinci Crescent, Dollard des Ormeaux, Province of Quebec H9B 2N1, Canada

[21] Appl. No.: 84,129

[22] Filed: Aug. 12, 1987

[51] Int. Cl.$^{4}$ ........................................ F16K 49/00

[52] U.S. Cl. ........................................ 137/567; 137/340; 137/428; 137/566; 101/364; 210/181; 210/197

[58] Field of Search ................ 101/364, 366; 137/565, 137/566, 567, 340, 428, 391; 210/194, 197, 181

[56] References Cited

U.S. PATENT DOCUMENTS

| | | | |
|---|---|---|---|
| 2,128,263 | 8/1938 | Ofeldt | 137/567 |
| 2,851,053 | 9/1958 | Wollner et al. | 137/567 |
| 3,511,378 | 5/1970 | Goregliad | 210/181 |
| 4,011,157 | 3/1977 | Pinnebalcer, Jr. et al. | 101/366 |

*Primary Examiner*—A. Michael Chambers

[57] ABSTRACT

A printing press liquid circulation system of the type wherein the liquid is circulated in a closed path to and from one or several fountain pans of the press by means of a pump. The system is characterized by the provision of an upright filter chamber, the lower section of which is connected to the suction side of the pump, said chamber being provided with a filter medium intermediate its ends, the return conduit of the fountain paths opening in the upper section of the filter chamber above said filter medium. A liquid make-up and proportional mixing system is provided to maintain at a predetermined level the liquid in the lower section of the filter chamber. Air cannot enter the liquid and, therefore, the formation of foam, either in the fountain path or in the pump and filter chamber lower section, is prevented. Preferably, the discharge of the pump is connected to a heat exchanger to maintain the liquid at the required temperature.

9 Claims, 1 Drawing Sheet

CENTRAL CIRCULATOR AND MIXER FOR FOUNTAIN SOLUTION FOR PRINTING PRESSES

FIELD OF THE INVENTION

The present invention relates to printing presses and, more particularly, to a liquid circulation system providing constant flow of filtered liquid to the fountain pans of the presses.

BACKGROUND OF THE INVENTION

In a conventional printing press, for instance an offset press composed of several printing units, each unit for printing in one colour, there is a cylindrical roller which is partially immersed in each fountain pan of each printing unit, and which is rotatable to pick up liquid from the pan and distribute a uniform film of liquid to a mating roller. A liquid circulation and make-up system must be provided. Constantly circulating the liquid in the fountain pan is desirable to maintain a minimum liquid temperature gradient across each pan, to prevent growth of algae and to flush foreign particles to be filtered off the liquid. Each fountain pan is provided with a stand-pipe and the liquid pumped into the pan rises to the height of the stand-pipe and drains through the stand-pipe to a return conduit. It is very important to prevent introduction of air into the liquid at any stage of the liquid circulation system. Air causes foaming, and this can produce unpriming of the circulating pump and also the presence of foam in the fountain pans has a noticeably adverse effect on the quality of printing.

U.S. Pat. No. 4,300,450 dated Nov. 17, 1981—to Gasparini and entitled: PRINTING PRESS LIQUID CIRCULATING SYSTEM INCLUDING AN ANTI-FOAMING DEVICE describes a printing press liquid circulation system of the type in which a venturi is used to circulate the liquid through a filter immersed in the liquid of a reservoir. A pump also immersed in said liquid is used both to circulate liquid through the venturi and into the fountain pan. Due to this arrangement, the pump must be of a much larger size than it would be necessary if it was used only to supply the liquid to the fountain pan of the press. Also, the liquid reservoir, together with the venturi, must be maintained at a certain relative level with respect to the fountain pan, in order for the venturi to operate properly. This system is therefore not adapted to be used in conjunction with several fountain pans disposed at different levels.

OBJECTS OF THE INVENTION

It is the general object of the present invention to provide a printing press liquid circulation system which obviates the above-noted disadvantages, which positively prevents any introduction of air into the liquid circulation circuit and in which the output of the circulation pump is solely used to supply the liquid to the fountain pan or pans.

Another object of the present invention resides in the provision of a system of the character described, provided with a heat exchanger to maintain the liquid at a predetermined temperature for maximum printing efficiency.

Another object of the present invention is to provide a system of the character described, provided with a proportional mixing and make-up station of simple construction.

Another object of the invention is to provide a system of the character described, which can feed several fountain pans located at different levels.

SUMMARY OF THE INVENTION

The printing press liquid circulation system of the invention is of the type wherein liquid is circulated to and from one or more fountain pans through a supply conduit and a return conduit, respectively. An upright filter chamber, having a liquid filter medium intermediate its ends, has its upper section connected to said return conduit and its lower section connected to the suction side of a liquid circulation pump. This filter chamber is sealed and is under vacuum by the action of the pump. Thus, the liquid returning from the pans is first filtered and then circulated by the pump back into the fountain pans. The system further includes liquid level maintaining means to maintain the liquid level in the lower filter chamber section above the inlet of the pump. Preferably, a heat exchanger is provided to cool the liquid discharged from the pump prior to its admission into the fountain pans. A by-pass conduit is preferably arranged between the heat exchanger and the lower section of the filter chamber and provided with a normally-closed valve which opens to the extent necessary to return the liquid back to the filter chamber in proportion to the number of printing units of the press which are shut down. The return conduits of the fountain pans are connected to a make-up reservoir, located below and beside the pans whereby the liquid is returned under gravity. The liquid is maintained at a predetermined level in the reservoir of the mixing station by the admission of make-up liquid controlled by a level sensor means, from a mixing chamber mounted above the reservoir and arranged to receive metered amounts of the various ingredients constituting the liquid-called solution, whereby the liquid can be discharged by gravity into the reservoir through a control valve. With the system in accordance with the invention, negative pressure exists only in the sealed filter chamber, whereby introduction of air into the liquid circuit is practically eliminated, thus avoiding foaming of the liquid while in the fountain pans and preventing unpriming of the circulating pump.

DETAILED DESCRIPTION OF THE INVENTION

Figure 1:
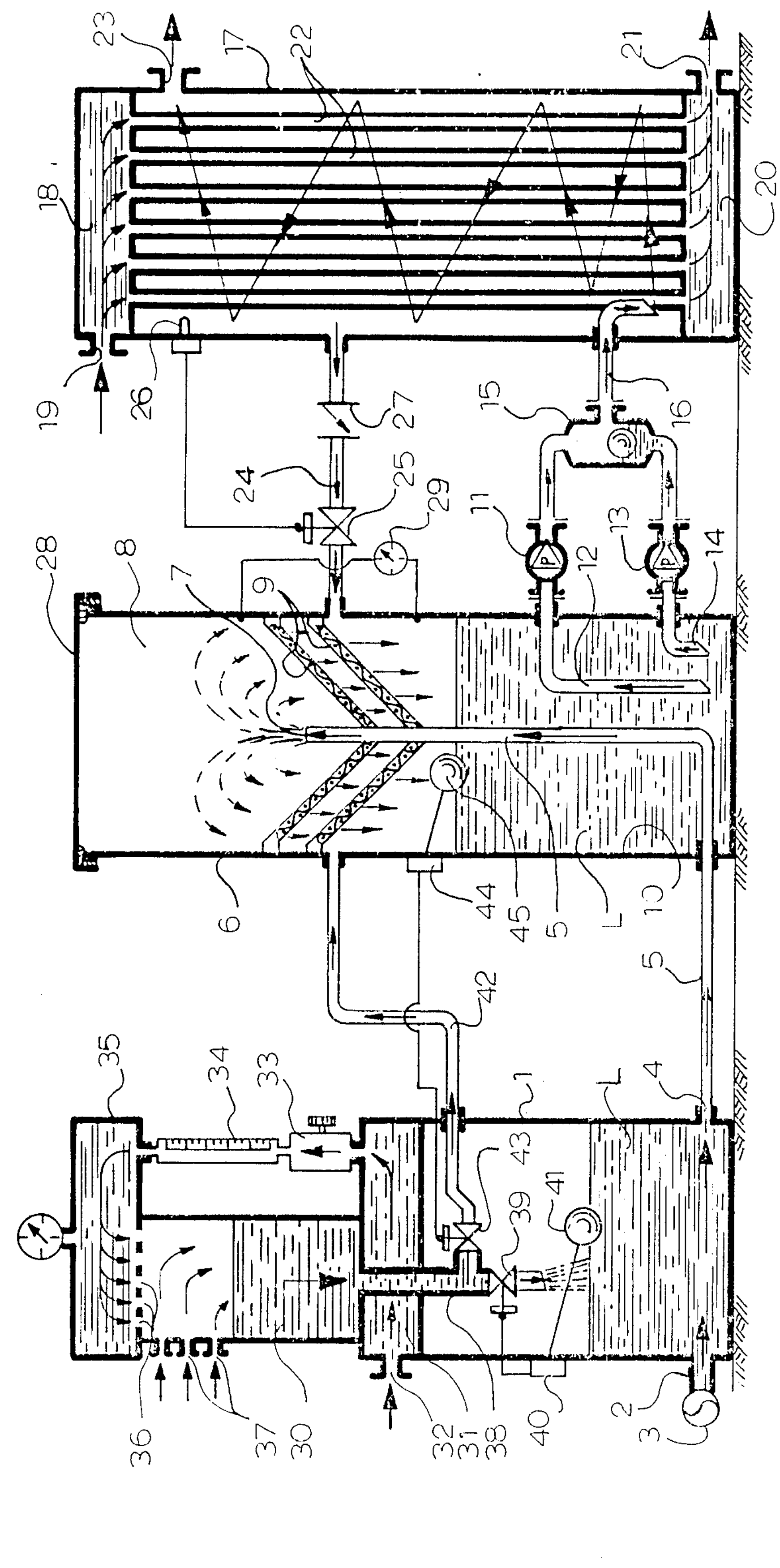
FIG. 1, the only figure, is a schematic elevation of the system of the invention.

An upright reservoir 1 containing the liquid to be circulated to one or more fountain pans, not shown, of one or more printing presses, has an inlet 2 near its bottom connected to a return header 3, in turn connected by piping, not shown, to the stand-pipes or overflow pipes of the several fountain pans of the printing press. These pans may be located at different levels but all above reservoir 1. This piping constitutes the return circuit of the liquid from the fountain pans. The outlet 4 of reservoir, also disposed just above the reservoir bottom, is connected by piping 5, which enters an upright filter chamber 6 and extends upwardly through the center of the filter chamber 6 to freely open at 7 in the upper section of filter chamber 6 above one or more funnel-shaped filters 9 extending across the filter chamber intermediate the ends thereof. Filters 9 separate the upper chamber section 8 from the lower chamber section 10. A liquid circulating pump 11, which is preferably of the rotary type and driven by an electric motor, has its suction tube 12 opening within the lower chamber section 10. A stand-by pump 13, similar to pump 11, is arranged in parallel with the latter, having its suction tube 14 also opening near the bottom of the lower chamber section 10. The outlets of both pumps 11 and 13 are connected to a check valve 15 of the double-action ball type, the common outlet pipe 16 of which opens within the bottom of an upright heat exchanger 17. The ball valve 15 prevents back flow of the liqud into the lower chamber section 10 upon stoppage of any one of the two pumps 11 and 13.

Heat exchanger 17 is of conventional construction and includes an inlet end header 18 for the admission of coolant liquid through the inlet 19 and a bottom outlet header 20 with a coolant outlet 21. The two headers are interconnected by a plurality of vertical pipes 22 defining a heat exchanger path for the coolant. The other heat exchanger path for the liquid extends around the pipes 22 and the outlet 23 of the liqud path is connected by supply conduits to the various pans to supply cooled and filtered liquid to the same.

A by-pass pipe 24 interconnects the liquid path of the heat exchanger 17 and the lower chamber section 10 to allow return of the liquid back into lower chamber section 10 and full continuous recycling of the liquid between the filter chamber and the heat exchanger whenever the printing press is in reduced operation or not operating. When the printing press is operating at full or closely-full capacity, by-pass tube 24 is normally closed by a solenoid-operated valve 25 controlled by a pressure sensor 26 exposed within the heat exchanger to be responsive to the pressure of the liquid in the outer liquid path of said heat exchanger. Solenoid valve 25 is normally closed but opens upon increase of the liquid pressure within the outer path of the heat exchanger above a predetermined limit. The supply conduit to each fountain pan is provided with a manual calibration valve which automatically closes when the printing press stops. Therefore, after the required calibration of fountain solution liquid, the liquid pressure may increase in the circuit upstream up to the level that causes opening of the solenoid valve 25.

A check valve 27 is series mounted in the by-pass pipe 24 to prevent back flow from the filter chamber to the heat exchanger.

When the printing press has several printing units, each having its own fountain pan or pans, the circulating and filtering system of the invention can be a central system for feeding the liquid to the several fountain pans. Each individual supply conduit is provided with an a manual calibration valve which can be closed when the specific printing unit is out of operation. The consequent pressure increase in the liquid path of the heat exchanger 17 is therefore proportional to the number of printing units which are shut down. This is sensed by sensor 26, which modulates accordingly the closing of the valve 25 which is then a modulator valve, so as to reduce the circulation of the liquid to the pans in accordance with the remaining number of printing units in operation, so as to prevent excessive flow of the liquid into each fountain pan. Therefore, the valve 25 can be a solenoid-operated shut-off valve when there is only one fountain pan and can be a modulated progressively-closing valve when the system is a central system for several fountain pans.

The filter chamber 6 is provided with a removable cover 28, which completely seals the chamber 8 when in closed position. Cover 28 is removed to gain access to the filters 9 and to replace the same when sufficiently clogged with impurities removed from the circulating liquid, as indicated by a gauge 29, connected across filters 9 and giving a reading of the pressure drop across filters 9.

When the system is in operation, with the pump 11 operating, the liquid level in reservoir 1 is lower than in filter chamber 6, as indicated in FIG. 1, because sealed filter chamber 6 is located on the suction side of the pump 11, and the space above the liquid in chamber 6 is under vacuum. The liquid in reservoir 1 is sucked through pipe 5 and issues from outlet 7; the liquid falls and is sucked through the filters 9 into the body of liquid in the lower filter chamber section 10. The filtered liquid is sucked by pump 11, cooled in the heat exchanger 17 and distributed into the several fountain pans. The printing press may run on different colors provided the liquid is suitable for these different colors.

Since the various tanks of the system are mounted directly on the floor of the printing plant, the various fountain pans, which might be a different levels, will be above the lower part of reservoir 1 and, therefore, the liquid from the fountain pans will be returned to reservoir 1 under gravity. Therefore, no air can enter the liquid in the return conduits and the air pressure above the liuqid in reservoir 1 will remain substantially at atmospheric pressure.

Since the liquid in the filter chamber 6 is maintained above the inlets of suction tubes 12 and 14, no air can become entrapped in the liquid held in the lower part of said filter chamber. Therefore, no air can be sucked by pump 11 or pump 13, and the latter cannot become umprimed and also the liquid fed by the pump to the heat exchanger and to the various fountain pans being under pressure, no air can become entrapped therein. Thus, no foaming in the fountain pans can take place.

Since pump 11 or pump 13 is solely used to circulate the liquid to the fountain pans and back, it needs only to have the required flow output for such requirement, as opposed to the above-noted U.S. Pat. No. 4,300,450.

Make-up liquid must be added from time to time to the liquid circuit. Reservoir 1 is provided on top thereof with a mixing chamber 30. A compartment 31 underneath mixing chamber 30 has an inlet 32 connected to a water source under pressure, such as a public water system. The water flows from compartment 31 through a manually-operated metering valve 33, then through a flow meter 34, then into a top header 35 where it falls into the mixing chamber through a plurality of apertures 36 made in the bottom of header 35.

Different liquid chemicals, for instance three types of chemicals, are fed each by a metering pump to the inlets 37 at the top of the mixing chamber 30, where they fall into said chamber and are mixed with the water to form the liquid to be fed to the fountain pans.

This liquid can also be replaced by a cleaning solution from the printing plates of the press.

By properly adjusting the metering valve 33 in accordance with the reading of the flow meter, it is a simple matter of mixing the ingredients with the water in the proper proportions to form a batch of the liquid in the mixing chamber 30. The bottom of said mixing chamber 30 communicates with the top of the reservoir 1 through a down tube 38 provided at its lower end with a solenoid valve 39, which, when open, discharges the make-up liquid directly into the reservoir 1. Valve 39 is controlled by a level switch 40 operated by a float 41. If the liquid level in the reservoir becomes too low as determined by the float 41 of the level switch 40, the valve 39 opens to admit make-up liquid from mixing chamber 30. Since this make-up liquid is discharged from the bottom of the mixing chamber, no air enters the reservoir 1.

An emergency liquid make-up system is also provided for the filter chamber 6. A pipe 42 interconnects the down pipe 38 upstream of valve 39 and the filter chamber 6 downstream of the filters 9. This pipe 42 is provided with a solenoid shut-off valve 43 normally closed and operated to open position under the action of a level switch 44 mounted within the lower chamber section 10 and including a float 45. Whenever the liquid level in the lower chamber section 10 falls below a predetermined limit, valve 43 opens, allowing make-up liquid to enter the filter chamber 6 until the prescribed level is attained. Therefore, there is never any possibility of the pump suction pipes becoming emerged from the liquid.

The filter chamber liquid make-up means is also used during start-up of the system when the reservoir 1 and the lower chamber section 10 are empty. Both make-up valves 39 and 43 are then open and the liquid is discharged simultaneously in both tanks until the respective desired levels are obtained. During this start-up operation, the cover 28 of the filter chamber is opened, while an air escape valve (not shown) connected to the upper part of reservoir 1 is also opened. Both are subsequently closed prior to starting of the pump. When the pump operates, partial vacuum will be produced in chamber 6 and the liquid level will decrease slightly.

What I claim is:

1. In a printing press liquid circulation system of the type wherein liquid is circulated to and from a fountain pan through a supply conduit and a return conduit, respectively, an upright filter chamber having a liquid filter medium intermediate its ends, said chamber defining an upper chamber section and a lower chamber section above and below said filter medium, respectively, said return conduit being connected to said upper chamber section, a liquid circulating pump having an inlet opening in the bottom of said lower chamber section and an outlet connected to said supply conduit, said filter chamber being sealed and under vacuum by the action of said pump when the latter is operating, whereby the liquid returning from said pan is first filtered by said filter medium and then circulated by said pump back to said pan, and liquid level maintaining means to maintain the liquid level in the lower chamber section above the inlet of said pump.

2. A liquid circulation system as defined in claim 1, further including a heat exchanger having one path series connected between the outlet of said pump and said supply conduit, and the other path series connected in a coolant circuit.

3. A liquid circulation system as defined in claim 2, further including a by-pass conduit interconnecting said one path and the lower chamber section, valve means normally closing said by-pass conduit and means responsive to the liquid pressure in said one path to open said valve means upon rising of said liquid pressure above a predetermined minimum.

4. A liquid circulation system as defined in claim 1, further including an upright reservoir series connected adjacent its bottom to said return conduit, said liquid normally filling said reservoir to a predetermined level above said return conduit, make-up liquid supply means opening into said reservoir and provided with a normally-closed power-actuated valve means and liquid level sensor means in said reservoir connected to said power-actuated valve means and operable to open said poweractuated valve means when said liquid level in said reservoir falls below a predetermined level.

5. A liquid circulating system as defined in claim 4, further including piping means interconnecting the lower chamber section with said make-up liquid supply means, and provided with a normally-closed second power-actuated valve means, and second liquid level sensor means in said lower chamber section operable to open said second power-actuated valve means when said liquid level in said lower chamber section falls below a predetermined level.

6. A liquid circulation system as defined in claim 4, wherein said return conduit includes a section extending from said reservoir, entering said filter chamber near its bottom, upwardly extending in the center of said chamber through and above said filter medium and freely opening in said upper section of said filter chamber.

7. A liquid circulation system as defined in claim 6, wherein said filter medium is funnel shaped.

8. A liquid circulation system as defined in claim 4, wherein said liquid is a mixture of several different liquids, and wherein said upright reservoir includes an upper mixing chamber adapted to contain a batch of metered amounts of said several liquids to be dispensed by gravity into said reservoir upon opening of said first-named power-actuated valve means.

9. A liquid circulation system as defined in claim 1, further including a second liquid pump parallel-connected with said first-named liquid pump to serve as a back-up upon failure of the latter, and further including double-acting check valve means connected to the outlet of both pumps to prevent back flow through the non-operating pump.

* * * * *